United States Patent [19]

Takashima et al.

[11] Patent Number: 5,050,446
[45] Date of Patent: Sep. 24, 1991

[54] VIBRATION AND TORSIONAL DAMPING COUPLING FOR A POWER TRANSMISSION

[75] Inventors: Kazutoshi Takashima; Hiroaki Fujimoto; Masaki Okazaki, all of Hamamatsu, Japan

[73] Assignee: Sanshin Kogyo Kabushiki Kaisha, Hamamatsu, Japan

[21] Appl. No.: 146,349

[22] Filed: Jan. 21, 1988

[30] Foreign Application Priority Data

Jan. 28, 1987 [JP] Japan .................. 62-17908

[51] Int. Cl.$^5$ .................................. F16F 16/10
[52] U.S. Cl. ......................... 74/574; 74/572; 74/573 F; 464/75
[58] Field of Search ............ 74/574, 572, 573 F; 188/378, 379; 464/73, 74, 75, 76, 180

[56] References Cited

U.S. PATENT DOCUMENTS

| | | | |
|---|---|---|---|
| 2,878,689 | 3/1959 | Aebersold | 74/574 |
| 2,949,021 | 8/1960 | Charlesworth | 464/180 X |
| 3,187,604 | 6/1965 | Hazel | 74/574 |
| 3,298,487 | 1/1967 | Tolksdorf et al. | 464/73 X |
| 3,603,172 | 9/1971 | Hall | 74/574 |
| 3,638,454 | 2/1972 | Croset | 464/76 |
| 3,640,149 | 2/1972 | McLean | 74/574 |
| 4,037,431 | 7/1977 | Sugimoto | 464/73 |
| 4,046,230 | 9/1977 | Troyer | 74/574 X |
| 4,114,472 | 9/1978 | Hornig et al. | 464/180 X |
| 4,172,510 | 10/1979 | Forkel | 74/574 X |
| 4,208,928 | 6/1980 | Conseur et al. | 74/574 |
| 4,226,139 | 10/1980 | Zilahi-Szabo | 74/574 |
| 4,241,593 | 12/1980 | Matyl et al. | 464/73 |
| 4,791,829 | 12/1988 | Fukushima et al. | 74/574 |

FOREIGN PATENT DOCUMENTS

| | | | |
|---|---|---|---|
| 2841063 | 3/1980 | Fed. Rep. of Germany | 464/73 |
| 153139 | 11/1981 | Japan | 74/574 |
| 61-59041 | 3/1986 | Japan. | |

Primary Examiner—Lenard A. Footland
Assistant Examiner—William G. Battista, Jr.
Attorney, Agent, or Firm—Ernest A. Beutler

[57] ABSTRACT

Several embodiments of combined torsional and elastic couplings for transmitting power from an engine output shaft that experiences torque fluctuations and a driveshaft. In each embodiment, the flexible coupling includes an inertial member that is coupled either elastically or by means of a viscous body to the engine output shaft for absorbing the torsional vibrations. In addition, an elastic coupling couples the engine output shaft to the driveshaft for permitting limited relative rotation to absorb torque flux variations in the engine output shaft.

4 Claims, 2 Drawing Sheets 5,050,446

VIBRATION AND TORSIONAL DAMPING COUPLING FOR A POWER TRANSMISSION

BACKGROUND OF THE INVENTION

This invention relates to a power transmission device and more particularly to an improved combination torsional and vibration damper for the power transmission system of an engine in an application such as in an outboard motor.

In conjunction with the propulsion of devices by means of internal combustion engines, it is oftentimes the practice to employ a flexible coupling in the drive from the engine to the propulsion device so as to absorb torque fluctuations as are inherent in the operation of internal combustion engines. In addition, it is also desirable to employ a torsional vibration damper in the engine so as to absorb torsional vibrations. The torsional vibration damper should be positioned in the drive train at a location other than a node of the torsional vibrations in order to assure good damping. In addition, the flexible coupling should also be located in a position where the torque variations can be effectively dampened. In many types of applications, this locating of the elements provides no problems due to the relatively long length of the drive train and the substantial dimensions of the associated unit being propelled.

In conjunction with outboard motors and marine outboard drives, however, the provision of the two separate elements at different locations can be quite a problem. Specifically, the compact configuration of a marine outboard drive makes it very difficult to employ two such devices in the drive train at the appropriate locations.

It is, therefore, a principal object of this invention to provide a combined torsional and vibration damping coupling for a power transmission.

It is a still further object of this invention to provide an improved, compact, torsional and vibration damping coupling for a power transmission for applications such as in a marine outboard drive.

SUMMARY OF THE INVENTION

This invention is adapted to be embodied in a combined torsional and vibration damping coupling for a power transmission for driving a drive shaft from an engine output shaft. The coupling comprises a first coupling member that is fixed for rotation with the output shaft and an inertial member that is coupled for rotation with and carried by the first coupling member and torsionally rotatable relative to the first coupling member for absorbing torsional vibrations of the engine output shaft. A second coupling member is affixed for rotation with the drive shaft and elastic coupling means couple the first and second coupling members for rotation and for permitting limited relative rotation between the first and second coupling members for absorbing torque variations in the shafts.

DETAILED DESCRIPTION OF THE PREFERRED EMBODIMENTS

Figure 1:
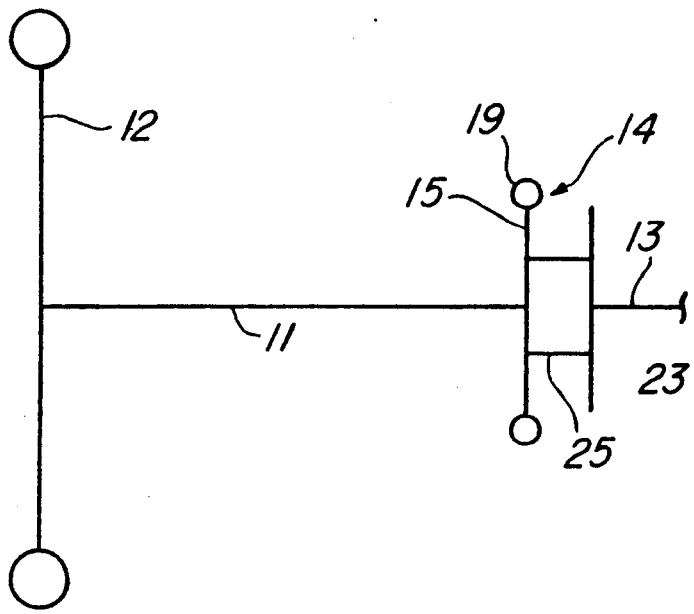
FIG. 1 is a schematic view of a power transmission device showing a combined torsional and vibration damping coupling.

Referring first to FIG. 1, a typical power transmission arrangement incorporating a combined torsional and vibration damping coupling in accordance with an embodiment of the invention is depicted. The power transmission device is comprised of an engine output shaft 11 that has a flywheel 12 affixed to one of its ends. The engine output shaft 11 drives a drive shaft 13 through a combined coupling, indicated generally by the reference numeral 14, which is, as will become apparent, designed so as to absorb both torsional and vibration loadings. Although the particular drive arrangement may be of any known type, the type of transmission device illustrated is typical with outboard motor practice in that the flywheel is mounted at the opposite end of the engine to that which drives the drive shaft. It is normally the practice in automotive applications to employ a torsional coupling directly at the flywheel and to provide a vibrational damping coupling somewhere in the connection between the engine output shaft and the final drive. In accordance with this invention, however, the coupling 14 provides both torsional and vibration damping characteristics and thus particularly lends itself for outboard drive applications.

Figure 2:
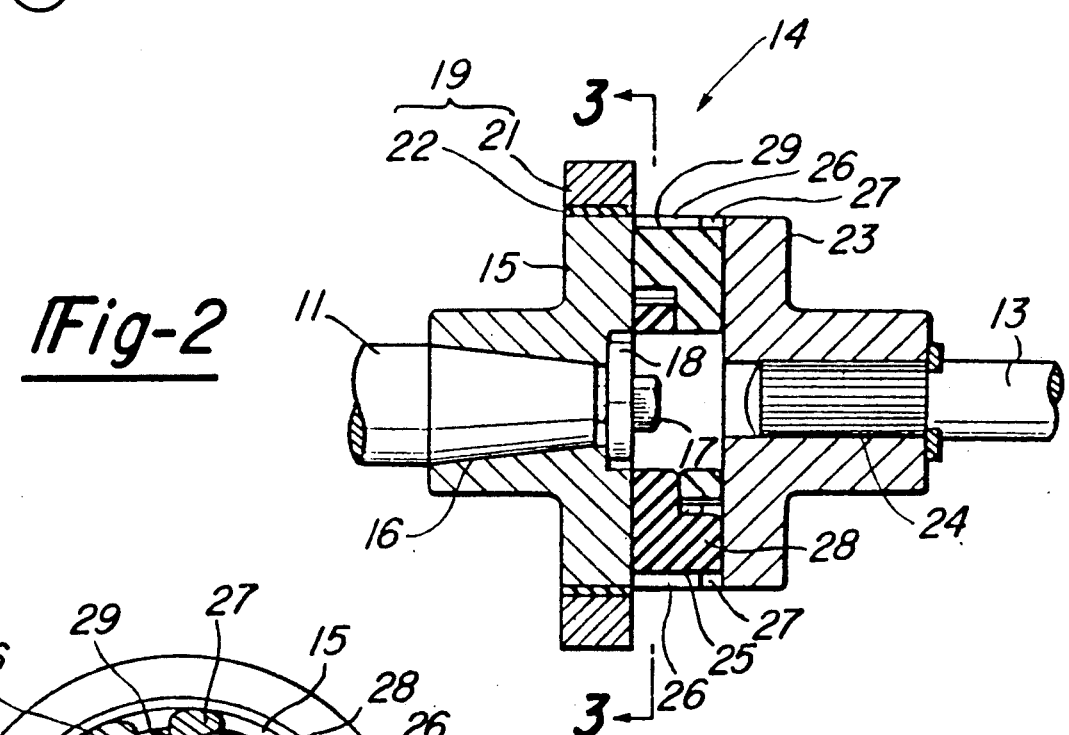
FIG. 2 is an enlarged cross-sectional view of the coupling shown in FIG. 1.
Figure 3:
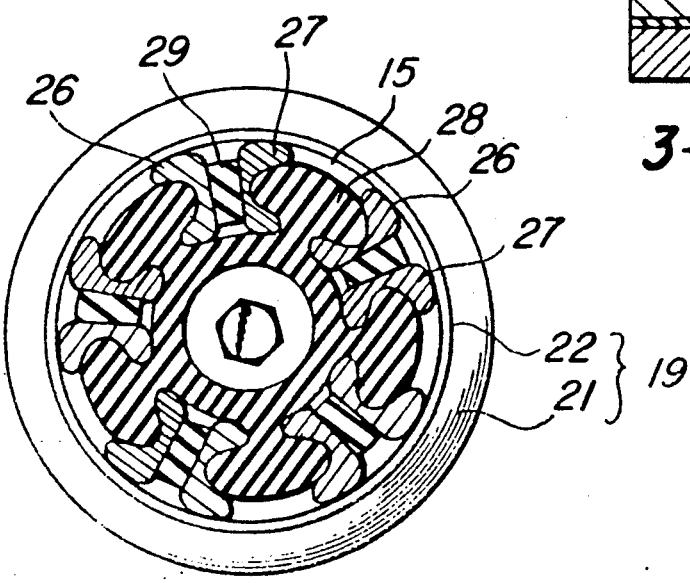
FIG. 3 is a cross-sectional view taken along the line 3—3 of FIG. 2.

Turning now specifically to the construction of the coupling 14, a first embodiment of a coupling arrangement is illustrated in more detail in FIGS. 2 and 3. As seen in these figures, the coupling 14 is comprised of a first coupling member 15 that is affixed for rotation with a tapered end 16 of the engine output shaft 11 by means of a bolt 17 and washer 18. The first coupling member 15 is provided with an integral torsional vibration damper, indicated generally by the reference numeral 19. The torsional vibration damper 19 is comprised of an annular inertial member 21 that is elastically affixed to a cylindrical outer surface of the coupling member 15 by means of an elastomeric ring 22 that is bonded or vulcanized to the inertial member 21 and the coupling member 15. As a result, the inertial member 21 is capable of limited circumferential movement relative to the coupling member 15 so as to absorb torsional vibrations.

The second coupling member 23 is affixed for rotation with the drive shaft 13 by means of a splined connection 24. A flexible connection, indicated generally by the reference numeral 25, is provided between the coupling members 15 and 23 so as to effect a driving connection between them but so as to permit some relative rotation therebetween for absorbing torque fluctuations.

The flexible coupling 25 is comprised of a first series of rearwardly extending lugs 26 that are formed integrally with the coupling member 15 and which extend toward the coupling member 23. The lugs 26 interdigitate with corresponding lugs 27 formed integrally with the coupling member 23. It should be noted, however, that the lugs 26 and 27 are spaced circumferentially from each other as may be best seen in FIG. 3. A first elastic member 28 is interposed between the lugs 26 and 27 and is adapted to yield in a counterclockwise direction upon rotation of the member 15 relative to the member 23 in this direction so as to absorb torsional vibrations. A second elastic member 29 is also interposed between the lugs 26 and 27 and acts to permit relative rotation in the clockwise direction of the member 15 relative to the member 23 so as to absorb torsional fluctuations in this direction. As a result, the total coupling assembly is extremely compact and will absorb both torsional vibrations and torque fluctuations for achieving damping.

Figure 4:
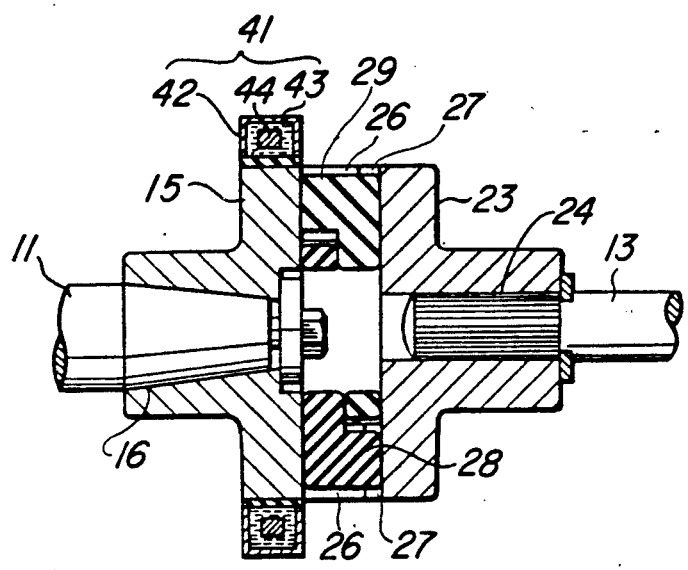
FIG. 4 is a cross-sectional view, in part similar to FIG. 2, showing another embodiment of the invention.

FIG. 4 shows another embodiment of the invention which differs from the embodiment of FIGS. 1 through 3 only in the form of the torsional vibration damper. For that reason, the flexible coupling 25 and first and second coupling members have been identified by the same reference numerals since these components do not differ from those previously described.

In this embodiment, the torsional vibration damper is indicated generally by the reference numeral 41 and includes an annular member 42 that is affixed for rotation with the first coupling member 15 and which defines an internal annular cavity that is filled with a viscous fluid 43 such as silicone. An annular inertial ring 44 is supported within this cavity and is coupled to the member 42 by the viscous fluid 43. As a result, the member 44 may rotate circumferentially relative to the member 42 and will absorb torsional vibrations.

Figure 5:
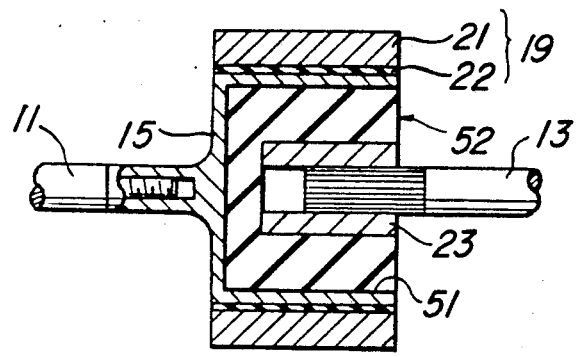
FIG. 5 is a cross-sectional view, in part similar to FIGS. 2 and 4, showing yet another embodiment of the invention.

FIG. 5 shows another form of coupling which generally embodies a torsional vibration damper of the type shown in FIGS. 2 and 3 and the components of this embodiment which are the same as components of the previously described embodiment have been identified by the same reference numeral and will not be described again in detail, except insofar as is necessary to understand the construction and operation of this embodiment. In this embodiment, the first coupling member 15 is elongated and defines a cylindrical internal cavity 51. An elastic coupling member 52 is contained within the cavity 51 and is affixed by bonding or other manners to the member 15. The elastic coupling member 52 has an internal cavity which receives and is affixed, as by bonding, to the second coupling member 23 so as to form the elastic coupling between the members 15 and 23.

Figure 6:
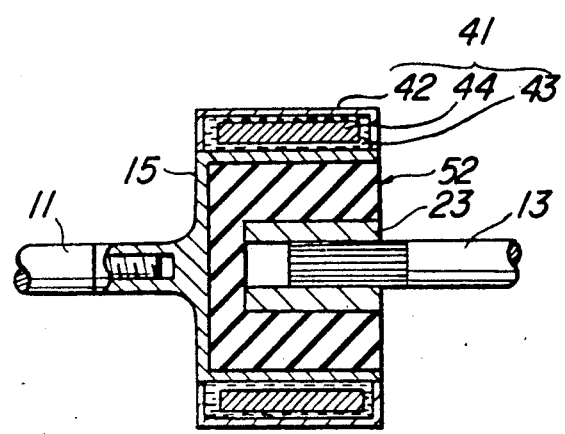
FIG. 6 is a cross-sectional view, in part similar to FIGS. 2, 4 and 5, showing a still further embodiment of the invention.

FIG. 6 shows yet another embodiment of the invention which is generally similar to the embodiment of FIG. 5 but which uses a viscous torsional vibration damper as in the embodiment of FIG. 4. Because of the similarity of the construction of this embodiment to those two previously described embodiments, components which are the same as those embodiments have been identified by the same reference numerals and further description of this embodiment is believed to be unnecessary.

From the foregoing description, it should be readily apparent that a number of embodiments of the invention have been described, each of which provides effective combined torsional and vibration damping couplings for a power transmission. Although a number of embodiments of the invention have been illustrated and described, various changes and modifications may be made without departing from the spirit and scope of the invention, as defined by the appended claims.

We claim:

1. A torsional and vibration damping coupling for a power transmission for directly coupling a drive shaft for simultaneous rotation with an engine output shaft that experiences torsional vibrations comprising a first coupling member fixed for rotation directly to said engine output shaft and rotating simultaneously therewith, an inertial member coupled for rotation with and carried by said first coupling member and torsionally rotatably relative to said first coupling member for absorbing torsional vibrations of said engine output shaft, a second coupling member affixed directly for rotation with aid drive shaft, an elastic coupling means for simultaneously coupling said first and said second coupling members for rotation and for permitting limited relative rotation between said first and said second coupling members for absorbing torque variations in said engine output shaft.

2. A torsional and vibration damping coupling as set forth in claim 1 wherein the inertial member is elastically coupled to the first coupling member.

3. A torsional and vibration damping coupling as set forth in claim 2 wherein the inertial member is viscously coupled to the first coupling member.

4. A torsional and vibration damping coupling as set forth in claim 1 wherein the elastic coupling means comprises interdigitated rigid members affixed to the first and second coupling members and interposed elastic elements.

* * * * *